No. 700,950. Patented May 27, 1902.
A. C. KREBS.
MOTOR VEHICLE.
(Application filed Aug. 9, 1901.)
(No Model.)
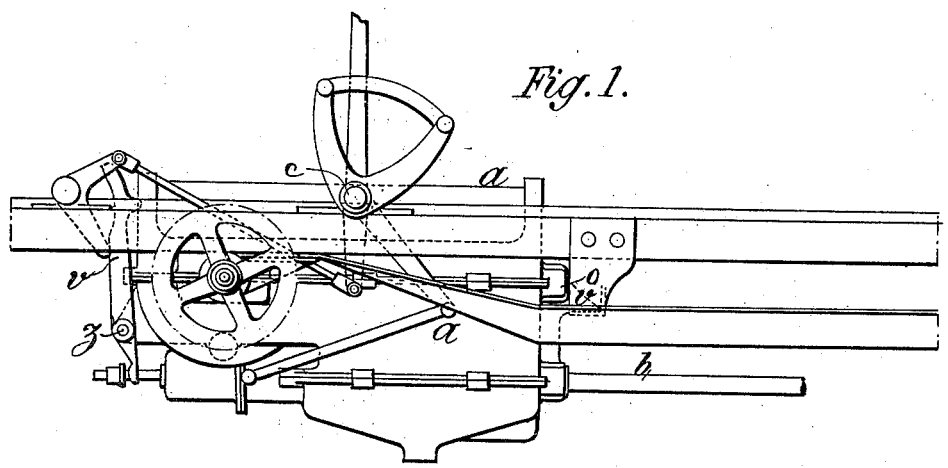
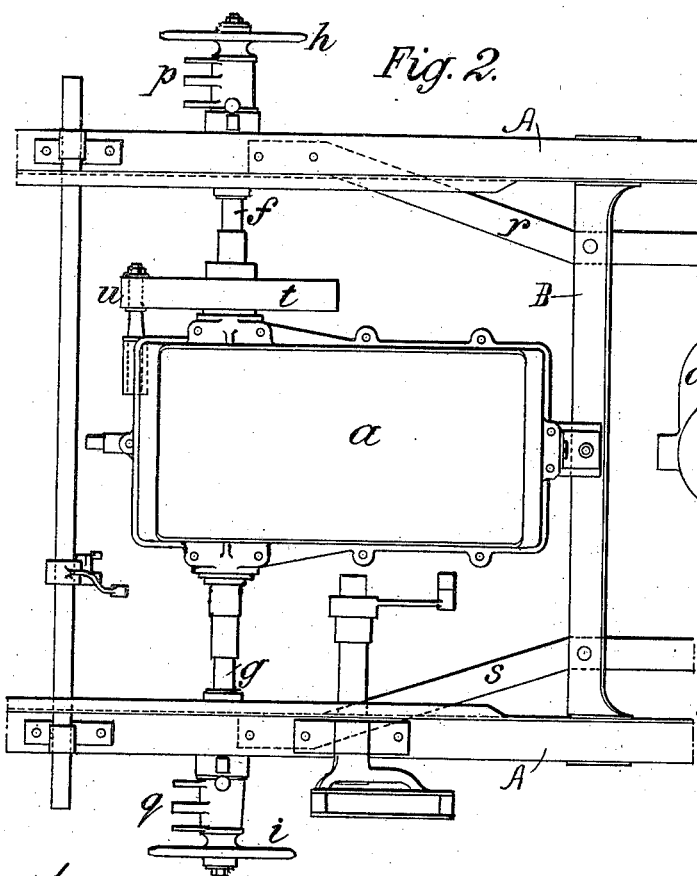
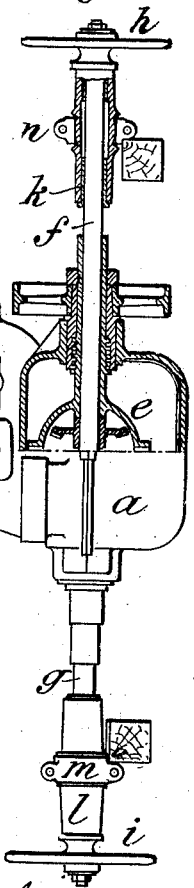

UNITED STATES PATENT OFFICE.

ARTHUR CONSTANTIN KREBS, OF PARIS, FRANCE, ASSIGNOR TO STE. AME DES ANCIENS ETABLISSEMENTS PANHARD ET LEVASSOR, OF PARIS, FRANCE.

MOTOR-VEHICLE.

SPECIFICATION forming part of Letters Patent No. 700,950, dated May 27, 1902.

Application filed August 9, 1901. Serial No. 71,517. (No model.)

*To all whom it may concern:*

Be it known that I, ARTHUR CONSTANTIN KREBS, a citizen of the Republic of France, residing in Paris, France, have invented certain new and useful Improvements Connected with the Mechanism for Change of Speed and Direction of Motion of Motor-Cars, of which the following is a specification.

It is common in automobiles to provide mechanism for transmitting the rotation of a driving-shaft to a pair of driven shafts which operate the driving-wheels of the vehicle and for transforming the rotation of the driving-shaft into motion of the driven shafts in different directions and at different speeds and for permitting a different movement of the driven shafts, so that the wheel on one side of the vehicle may turn faster than that on the other side in going around corners. The details of this mechanism vary considerably in different types of vehicle; but usually the complete mechanism for producing the transmission and changes of motion is carried in a single casing.

My invention relates to a method of suspending the mechanism described and the casing thereof from the framing of the vehicle, which avoids wedging of the shafts in their bearings and which permits the easy and rapid removal of the casing carrying the mechanism from the framing of the car.

My invention provides also other improvements, as hereinafter specified.

The improved construction is shown on the accompanying drawings, in which—

Figure 1 shows a sectional side elevation, Fig. 2 a plan, and Fig. 3 a part-sectional end view, of the casing and mechanism detached.

The framing of the car preferably comprises longitudinal members A, connected by means of one or more cross-bars B and stiffened by oblique angle-irons $r$ and $s$.

$a$ is a casing or box containing the mechanism for changing the speed and direction of motion.

$b$ is the driven shaft connected to the motor, and $c$ is the upper shaft of the mechanism for changing the speed, and $d$ is the shaft of the mechanism for changing the direction of motion.

At $e$ is indicated a differential gear, which may be of any suitable style and which permits the driven shafts $f$ and $g$ to rotate at different speeds as the vehicle turns a corner, the shafts $fg$ being extended outside and carrying the pitch-wheels $h\,i$ of driving-chains, the shafts being supported in bearings $k$ and $l$, the supports $m$ and $n$ of which are formed in two pieces.

The mechanism for changing the speed and direction and the differential gear are so well known as not to require illustration in detail.

The casing $a$ for the change of speed-gear is supported in front at $o$. The supports of the bearings for the differential gear fixed to the framing are so arranged, as are also the bearings, as to allow of a certain deformation of the framing without causing any wedging of the bearings upon the shafts of the differential gear. The front support $o$ is also so arranged as to allow of a certain motion of the casing relatively to the framing. Under these conditions the casing, suspended at three points from the framing, will always remain in the plane defined by these three points. The stay-rods from the road-wheel axle are attached to the lugs $p\,q$ of the bearings $k$ and $l$, and consequently serve as abutments to the shafts of the pitch-wheels $h\,i$ for withstanding the tractional strain exercised by the chains of these wheels. The supports $m$ and $n$, fixed to the framing, are also connected to the angle-irons $r\,s$ of the motor-frame. A perfectly strong connection is thus effected between the motor and the mechanisms for changing the speed and direction of motion as regards the relative positions of the parts, while allowing of any possible or accidental deformation of the framing of the motor-car without producing any wedging of the transverse shaft $fg$. The brake $t$, acting upon the differential gear, has its point of connection on a pin $u$, fixed directly to the casing $a$. In like manner the pivot $z$ of the disengaging lever $v$ is also fixed on the casing. This method of suspending the casing allows of the simple and rapid disconnection thereof. It suffices after removing the chains and disconnecting the stay-rods to remove the bolt from the lug $o$ to take off the caps of the supports $m$ and $n$ and to slide back the casing a. The lug o being disengaged, the casing can be lowered without obstacle.

Having thus described the nature of this invention and the best means I know of carrying the same into practical effect, I claim—

1. The combination with a motor-car having a motor-shaft, a driven shaft, and intermediate motion-transmitting mechanism, of a brake for said mechanism, an operating-lever of said brake mounted directly on the casing of said mechanism, and means for suspending said casing movably relatively to the framing of the car, whereby the wedging of the shaft of said mechanism in its bearings is avoided.

2. The combination with a motor-car having a motor-shaft, a driven shaft, and intermediate motion-transmitting mechanism, of a casing for said mechanism, and supports $m$ $n$ and $o$ for said mechanism connected to the framing of the car whereby the easy and rapid removal of the mechanism from the framing of the car may be effected.

3. The combination with a motor-car having a motor-shaft, a driven shaft, and intermediate motion-transmitting mechanism, of a casing for said mechanism, and supports $m$ $n$ and $o$ for said mechanism connected flexibly to the framing of the car whereby the easy and rapid removal of the mechanism from the framing of the car may be effected, and whereby the wedging of the shaft of said mechanism in its bearings is avoided.

4. The combination with a motor-car having a motor-shaft, a driven shaft, and intermediate motion-transmitting mechanism, of a brake for said mechanism, an operating-lever of said brake mounted directly on the casing of said mechanism, and supports $m$ $n$ and $o$ for said mechanism connected flexibly to the framing of the car whereby the easy and rapid removal of the mechanism from the framing of the car may be effected, and whereby the wedging of the shaft of said mechanism in its bearings is avoided.

In witness whereof I have hereunto signed my name in the presence of two subscribing witnesses.

ARTHUR CONSTANTIN KREBS.

Witnesses:
JULES ARMENGAUD, Jeune,
MARCEL ARMENGAUD, Jeune.